United States Patent
Hoye et al.

(10) Patent No.: US 9,238,467 B1
(45) Date of Patent: Jan. 19, 2016

(54) AUTOMATIC ENGAGEMENT OF A DRIVER ASSISTANCE SYSTEM

(71) Applicant: Lytx, Inc., San Diego, CA (US)

(72) Inventors: Brett Hoye, San Marcos, CA (US); Daniel Lambert, Carlsbad, CA (US); Greg Sutton, Del Mar, CA (US)

(73) Assignee: Lytx, Inc., San Diego, CA (US)

( * ) Notice: Subject to any disclaimer, the term of this patent is extended or adjusted under 35 U.S.C. 154(b) by 75 days.

(21) Appl. No.: 14/137,777

(22) Filed: Dec. 20, 2013

(51) Int. Cl.
*B60W 50/14* (2012.01)
(52) U.S. Cl.
CPC ..................................... *B60W 50/14* (2013.01)
(58) Field of Classification Search
CPC .......................................................... B60W 50/14
See application file for complete search history.

(56) References Cited

U.S. PATENT DOCUMENTS

| | | | |
|---|---|---|---|
| 6,580,973 B2* | 6/2003 | Leivian et al. | 701/1 |
| 2007/0080825 A1* | 4/2007 | Shiller | 340/903 |
| 2007/0182529 A1* | 8/2007 | Dobler et al. | 340/438 |
| 2007/0203617 A1* | 8/2007 | Haug | 701/1 |
| 2010/0030434 A1* | 2/2010 | Okabe et al. | 701/48 |
| 2012/0083960 A1* | 4/2012 | Zhu et al. | 701/23 |

* cited by examiner

*Primary Examiner* — Mussa A Shaawat
*Assistant Examiner* — Kelly D Williams
(74) *Attorney, Agent, or Firm* — Van Pelt, Yi & James LLP

(57) ABSTRACT

A system for automatic engagement of a driver assistance system comprises an input interface, a processor, and an output interface. The input interface is configured to receive data associated with one or more events. The processor is configured to evaluate the risk associated with the data and to determine that the risk indicates a state change in a driver assistance system is appropriate. The output interface is configured to provide an indication that the state change in the driver assistance system is appropriate.

22 Claims, 5 Drawing Sheets

US 9,238,467 B1

AUTOMATIC ENGAGEMENT OF A DRIVER ASSISTANCE SYSTEM

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, a global positioning system (GPS), etc., that report data, which is used to determine the occurrence of an anomalous event. If an anomalous event is detected, then sensor data related to the event is recorded and transmitted to a vehicle data server for later review. An anomalous event can also place the vehicle and its driver and passengers at risk.

BRIEF DESCRIPTION OF THE DRAWINGS

Various embodiments of the invention are disclosed in the following detailed description and the accompanying drawings.

DETAILED DESCRIPTION

Figure 1:
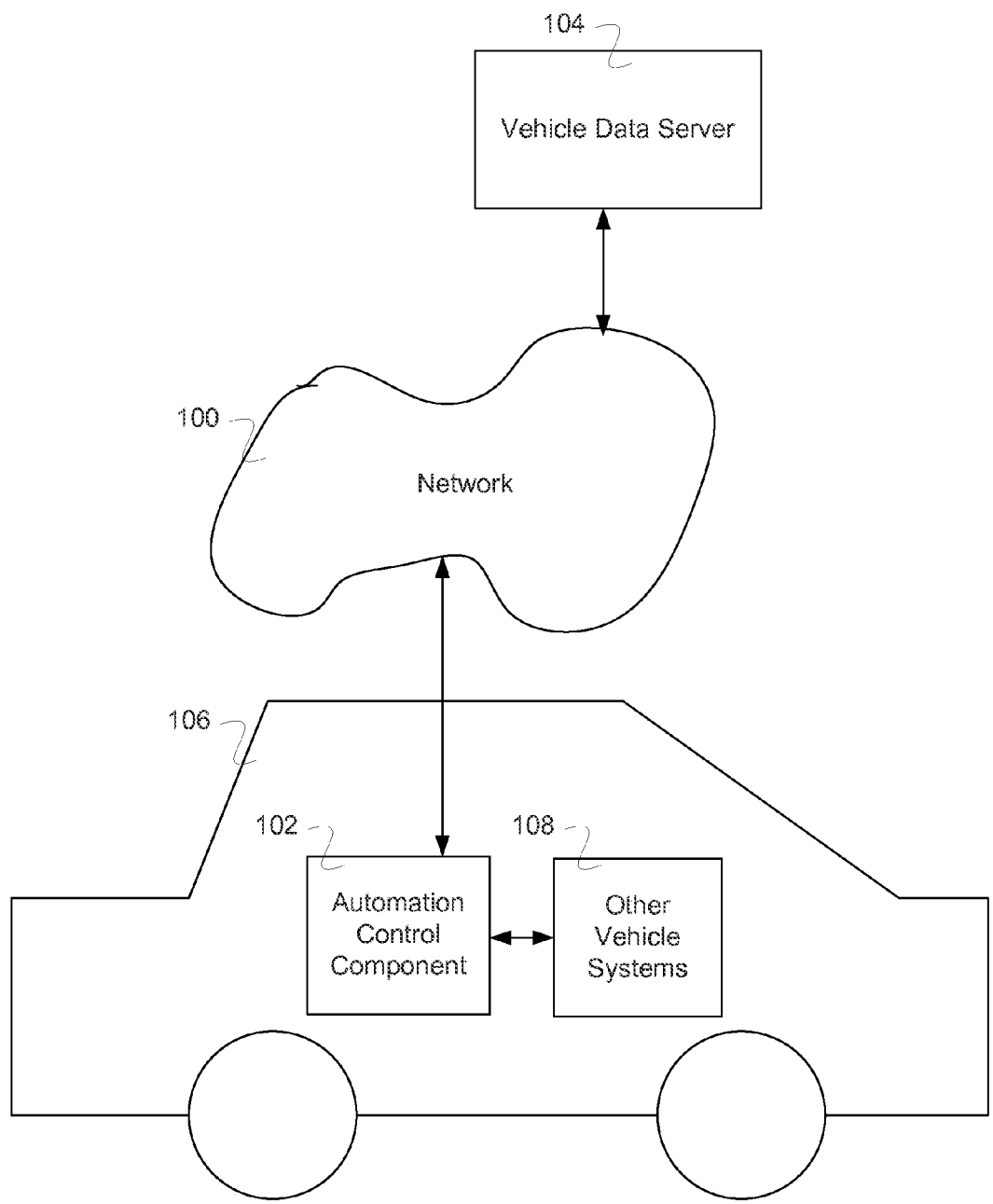
FIG. 1 is a block diagram illustrating an embodiment of a system for automatic engagement of a driver assistance system including a automation control component.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic engagement of a driver assistance system is disclosed. A system for automatic engagement of a driver assistance system comprises an input interface configured to receive data associated with one or more events, a processor configured to evaluate the risk associated with the data and determine that the risk indicates a state change in a driver assistance system is appropriate, and an output interface configured to provide an indication that the state change in the driver assistance system is appropriate. The system for automatic engagement of a driver assistance system additionally comprises a memory coupled to the processor and configured to provide the processor with instructions.

An automation control component is used for automatically indicating a state change for a driver assistance program. In some embodiments, the automation control component comprises a vehicle event recorder. A vehicle event recorder mounted on a vehicle records vehicle data and anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. The vehicle event recorder analyzes data from sensors (e.g., video recorders, audio recorders, accelerometers, gyroscopes, vehicle state sensors, global positioning systems (GPSs), etc.) to determine when an anomalous event has occurred. The vehicle event recorder transmits event data, including sensor data, to a vehicle data server, where the data is stored and analyzed. The vehicle event recorder additionally analyzes the data to determine if it indicates imminent hazards. Imminent hazards include a dangerous driver state (e.g., road rage, drunk driver, etc.) and a dangerous external state (e.g., icy road, failing brakes, poor visibility, etc.). In the event that an imminent hazard is detected, the vehicle event recorder has the capability of triggering a driver assistance system. In some embodiments, the driver assistance system comprises an autonomous driver assistance system. In some embodiments, the driver assistance system comprises a set of Advanced Driver Assistance Systems (ADAS). In various embodiments, the driver assistance system comprises electronic stability control, braking assistance, adaptive cruise control, automatic lane following, automatic steering and navigation, full automated driving, or any other appropriate driver assistance system. The vehicle event recorder additionally has the capability of reducing the vehicle performance via the driving subsystems in order to put the vehicle into a safer state (e.g., reducing the maximum speed, reducing the maximum acceleration, avoiding cornering too tightly at too high speed, progressive shut down (e.g., lower the maximum speed progressively until the vehicle is fully disabled), etc.). In some embodiments, in response to an imminent hazard, the vehicle event recorder determines an appropriate driver assistance system state is appropriate and/or a driving assistance subsystem state is appropriate, and communicates the determination of whether the states of the driver assistance system and the driving subsystems are appropriate.

In some embodiments, a vehicle event recorder determines that there is risk to the vehicle using the data collected from sensors. The evaluation of the risk is used to determine if a state change to a driving assistance system is appropriate. For example, the evaluation of risk is used to determine that the vehicle should slow down and come to a halt, automatically avoid a collision, or maintain lane position and the determination is used to cause an indication to the driving assistance system to change its state to perform an appropriate action.

FIG. 1 is a block diagram illustrating an embodiment of a system for automatic engagement of a driver assistance system including an automation control component. Automation control component 102 comprises an automation control component mounted in vehicle 106 (e.g., a car or truck). In some embodiments, automation control component 102 includes or is in communication with a set of sensors—for example, video recorders, audio recorders, accelerometers, gyroscopes, vehicle state sensors, GPS, outdoor temperature sensors, moisture sensors, laser line tracker sensors, radar, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, automation control component 102 comprises a system for processing sensor data and detecting events. In some embodiments, automation control component 102 comprises map data. In some embodiments, automation control component 102 comprises a system for detecting risky behavior. In various embodiments, automation control component 102 is mounted to vehicle 106 in one of the following locations: the chassis, the front grill, the dashboard, the rear-view mirror, or any other appropriate location. In some embodiments, automation control component 102 comprises multiple units mounted in different locations in vehicle 106. In some embodiments, automation control component 102 comprises a communications system for communicating with network 100. In various embodiments, network 100 comprises a wireless network, a wired network, a cellular network, a Code Division Multiple Accessing (CDMA) network, a Global System for Mobile (GSM) communications network, Wideband Code Division Multiple Access (W-CDMA), Long Term Evolution (LTE), a local area network, a wide area network, the Internet, or any other appropriate network. In some embodiments, network 100 comprises multiple networks, changing over time and location. Automation control component 102 communicates with vehicle data server 104 via network 100. Automation control component 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by automation control component 102. In some embodiments, vehicle data server 104 comprises a system for collecting data from multiple automation control components. In some embodiments, vehicle data server 104 comprises a system for analyzing automation control component data. In some embodiments, vehicle data server 104 comprises a system for displaying automation control component data. In some embodiments, vehicle data server 104 is located at a home station (e.g., a shipping company office, a taxi dispatcher, a truck depot, etc.). In some embodiments, events recorded by automation control component 102 are downloaded to vehicle data server 104 when vehicle 106 arrives at the home station. In some embodiments, vehicle data server 104 is located at a remote location. In some embodiments, events recorded by automation control component 102 are downloaded to vehicle data server 104 wirelessly. In some embodiments, a subset of events recorded by automation control component 102 is downloaded to vehicle data server 104 wirelessly. Vehicle 106 additionally comprises other vehicle systems 108 in communication with automation control component 102 (e.g., sensor systems, user interface systems, driving subsystems, driver assistance systems, etc.).

Figure 2:
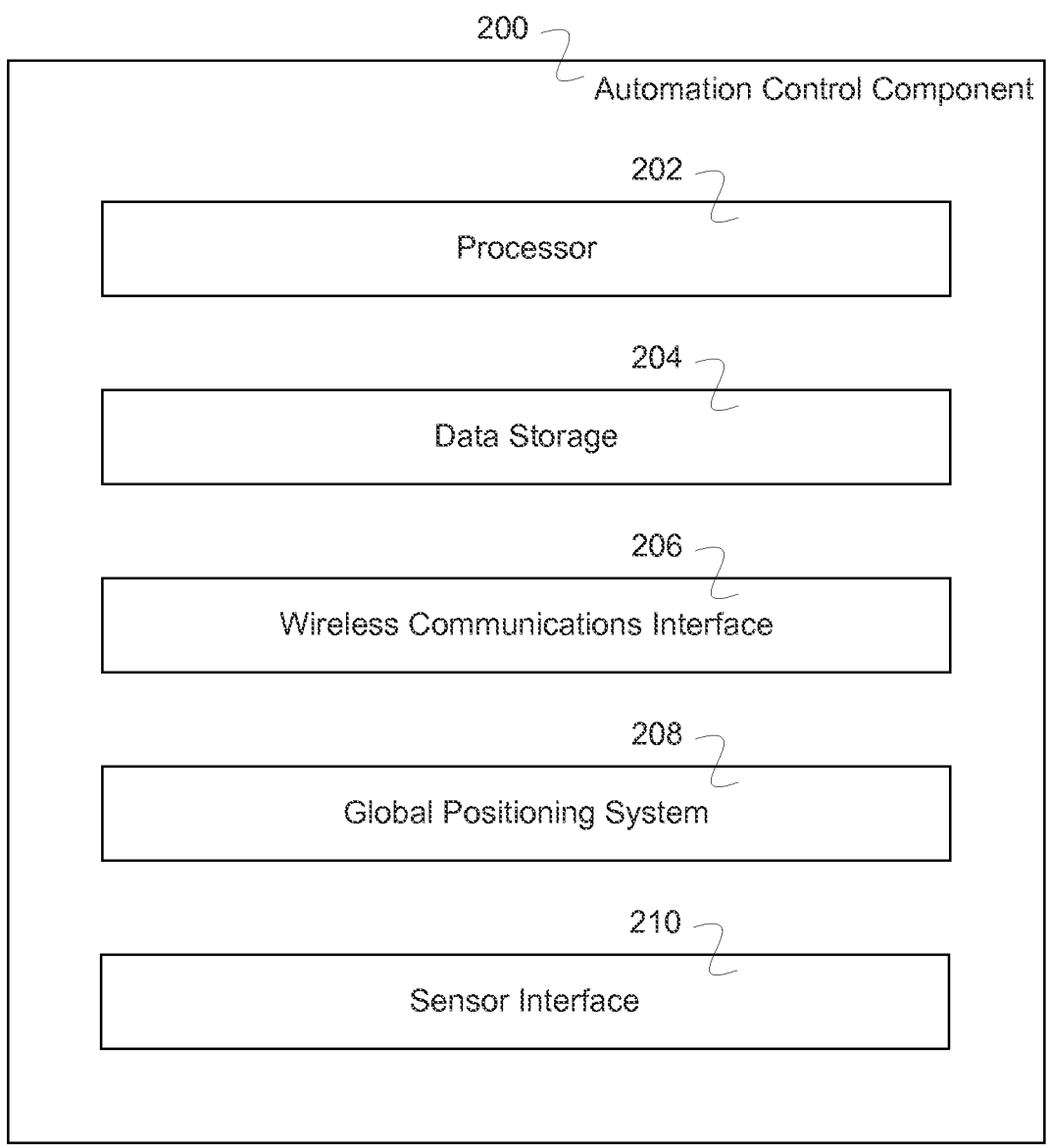
FIG. 2 is a block diagram illustrating an embodiment of a automation control component for an automatic engagement of a driver assistance system.

FIG. 2 is a block diagram illustrating an embodiment of an automation control component for an automatic engagement of a driver assistance system. In some embodiments, automation control component 200 of FIG. 2 comprises automation control component 102 of FIG. 1. In the example shown, automation control component 200 comprises processor 202. Processor 202 comprises a processor for controlling the operations of automation control component 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, automation control component data, vehicle event data, sensor data, video data, map data, or any other appropriate data. In various embodiments, wireless communications interface 206 comprises one or more of a GSM interface, a CDMA interface, Wideband Code Division Multiple Access (W-CDMA) interface, Long Term Evolution (LTE) interface, a WiFi interface, or any other appropriate interface. Global positioning system 208 comprises a global positioning system (e.g., GPS) for determining a system location. Sensor interface 210 comprises an interface to one or more automation control component sensors. In various embodiments, automation control component sensors comprise an external video camera, an internal video camera, a microphone, an accelerometer, a gyroscope, an outdoor temperature sensor, a moisture sensor, a laser line tracker sensor, a radar, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 210 comprises an on-board diagnostics (OBD) bus (e.g., society of automotive engineers (SAE) J1939, J1708/J1587, On-Board Diagnostics OBD-II, controller area network (CAN) BUS, etc.) or a Powertrain Control Module (PCM). In some embodiments, automation control component 200 communicates with vehicle state sensors via OBD bus.

Figure 3:
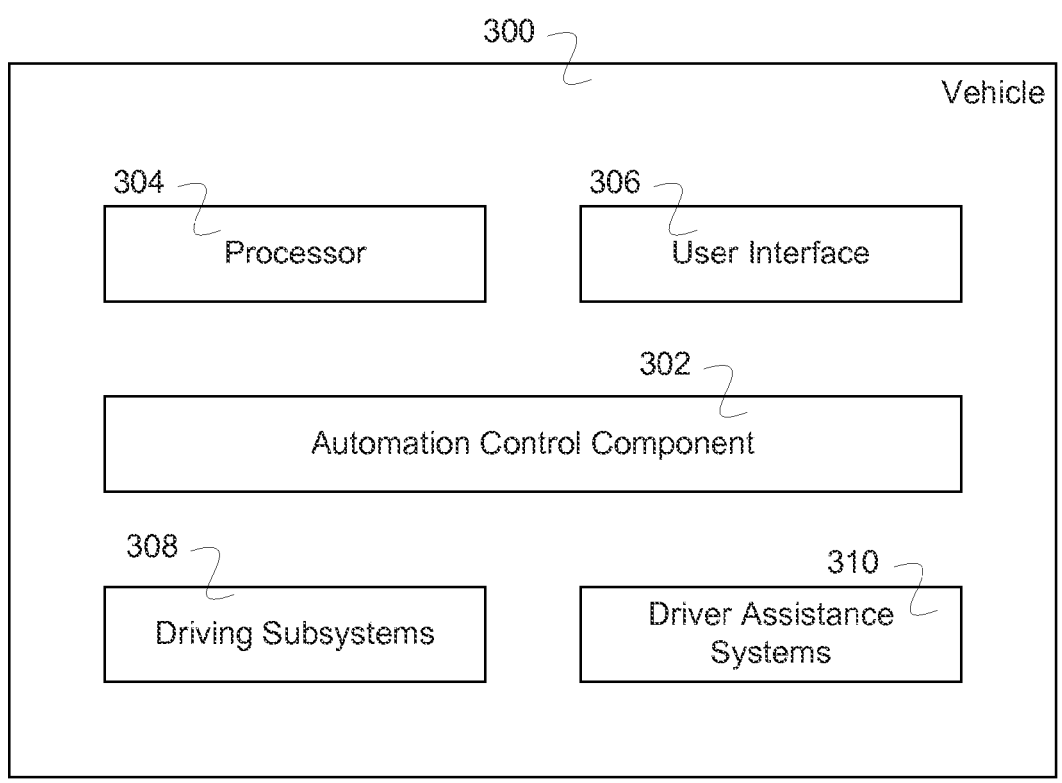
FIG. 3 is a block diagram illustrating an embodiment of subsystems of a vehicle.

FIG. 3 is a block diagram illustrating an embodiment of subsystems of a vehicle. In some embodiments, vehicle 300 comprises vehicle 106 of FIG. 1. In the example shown, vehicle 300 comprises automation control component 302. In some embodiments, automation control component 302 comprises automation control component 200 of FIG. 2. Automation control component 302 receives sensor data from sensors 304. In various embodiments, automation control component 302 processes sensor data to determine occurrence of anomalous events, to determine when driver assistance systems should be activated, to determine when driving subsystems should be modified, to determine when video data should be recorded, to evaluate the risk associated with the data, or for any other appropriate reason. In various embodiments, the risk indicates distracted driving, drowsy driving, intoxicated driving, aggressive driving, a legal infraction, icy or slippery roads, poor visibility, rain, failing brakes, a damaged tire, dangerous road conditions, or any other appropriate risky situation. In some embodiments, automation control component 302 provides the data to a server (e.g., vehicle data server 104 of FIG. 1) for evaluation. Automation control component 302 receives from the server in response a determination of the risk associated with the data. In some embodiments, the automation control component receives a determination that the risk indicates a state change in driver assistance systems 310 is appropriate. In some embodiments, in the event that automation control component 302 determines that the risk indicates a state change in driver assistance systems 310 is appropriate, automation control component 302 provides an indication that a change of the state of driver assistance systems 310 is appropriate. In some embodiments, in the event automation control component 302 determines that the state of driver assistance systems 310 or driving subsystems 308 should be changed, an indication is provided to the driver that a state change is appropriate via user interface 306. In various embodiments, the indication comprises an audible indication, a visual indication, a haptic indication, or any other appropriate indication. In some embodiments, user interface 306 includes a control (e.g., a button) for a user to indicate that the state of driver assistance systems 310 should change (e.g., to manually turn on the driver assistance systems). In some embodiments, the control for a user to indicate that the state of driver assistance systems 310 should change comprises a control accessible via a cell phone (e.g., user interface 306 comprises an app running on a cell phone communicating with automation control component 302).

Driving subsystems 308 comprise subsystems controlling the various driving elements of the vehicle (e.g., acceleration, brakes, steering, etc.). In some embodiments, driving subsystems 308 receive commands from the vehicle controls (e.g., accelerator pedal, brake pedal, steering wheel) and provide commands to the driving elements of the vehicle to operate the vehicle as indicated by the driver. Driving subsystems 308 can modify the performance of the driving elements of the vehicle (e.g., limit the acceleration, limit the maximum speed, avoid cornering too tightly at too high speed, etc.) in response to a command to change state from automation control component 302 or in response to an indication that a change of state is appropriate. Driver assistance systems 310 comprise one or more systems for automatically assisting the driver. In various embodiments, driver assistance systems 310 comprise electronic stability control, braking assistance, adaptive cruise control, automatic lane following, automatic steering and navigation, full automated driving, or any other appropriate driver assistance systems. In some embodiments, driver assistance systems 310 provide commands to driving subsystems 308 to control the driving elements of the vehicle. In some embodiments, driver assistance systems 310 comprises autonomous driver assistance systems. In some embodiments, driver assistance systems 310 comprises a set of Advanced Driver Assistance Systems (ADAS). Driver assistance systems 310 responds to a command indicating a change in state or an indication that a change of state is appropriate by activating one or more of the driver assistance systems. In some embodiments, driver assistance systems 310 responds to a command indicating a change in state or an indication that a change of state is appropriate by modifying a level of one or more of the driver assistance systems.

Figure 4:
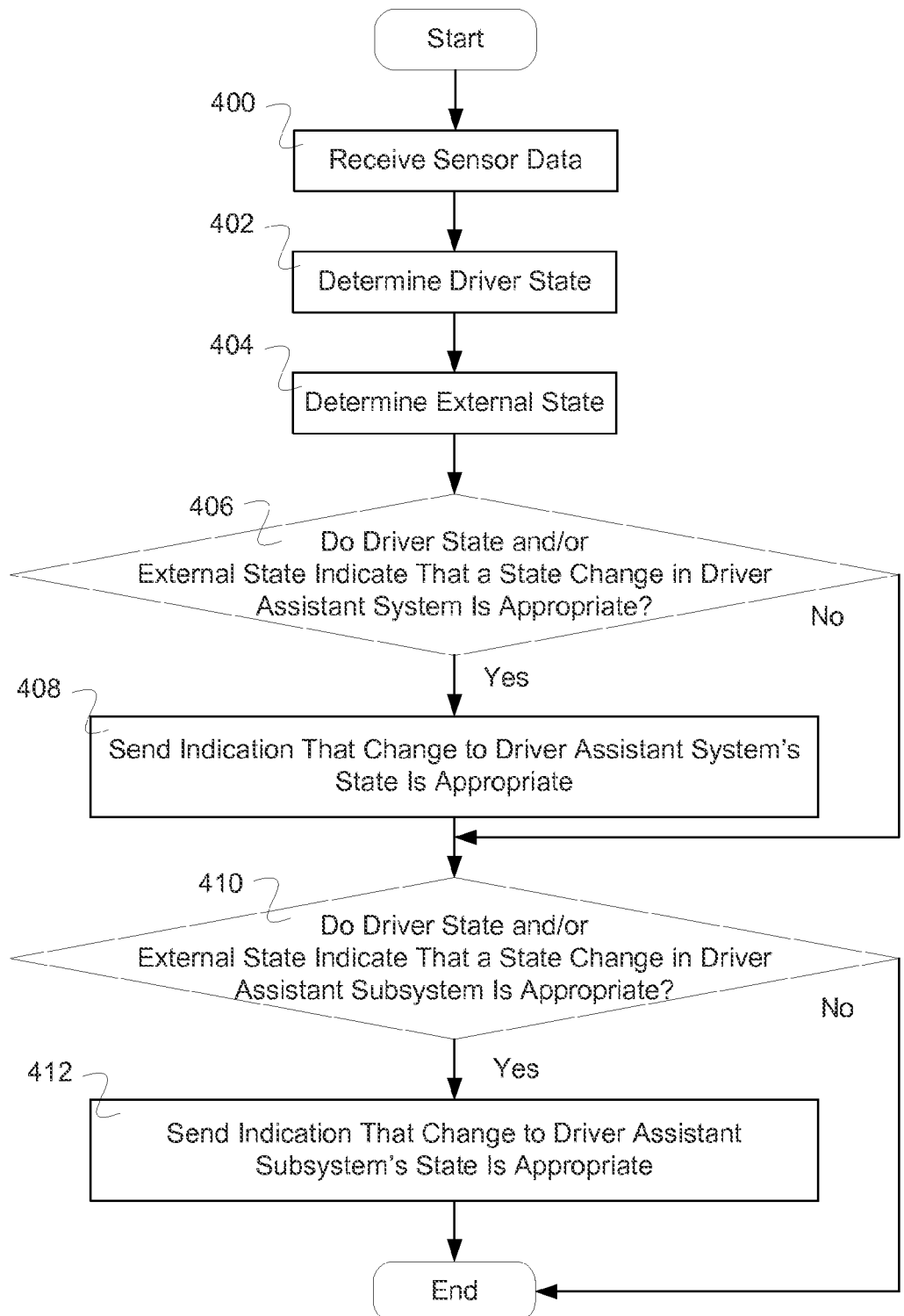
FIG. 4 is a flow diagram illustrating an embodiment of a process for automatic engagement of a driver assistance system.

FIG. 4 is a flow diagram illustrating an embodiment of a process for automatic engagement of a driver assistance system. In some embodiments, the process of FIG. 4 is executed by an automation control component (e.g., automation control component 302 of FIG. 3). In the example shown, in 400, sensor data is received. In some embodiments, sensor data is associated with an event (e.g., a driving event that is an occasion indicating that sensor data is to be recorded and evaluated for risk. For example, sensor data is analyzed to determine whether one or more events are to be recorded for analysis and evaluation. In various embodiments, an event of the one or more events comprises a driving event that is recorded and evaluated for a state of a driver, an external state indicative of risk, or any other appropriate data. In various embodiments, sensor data comprises video recorder data, audio recorder data, accelerometer data, gyroscope data, vehicle state sensor data, GPS data, radar data or any other appropriate data. In 402, a driver state is determined. In various embodiments, a driver state comprises normal, drowsy, aggressive, intoxicated, distracted, or any other appropriate driver state. In 404, an external state is determined. In some embodiments, an external state comprises a vehicle state (e.g., normal, failing brakes, damaged tire, low on gas, etc.). In some embodiments, an external state comprises an outside state (e.g., icy roads, poor visibility, rain, dangerous road conditions, etc.). In 406, it is determined whether the driver state and/or the external state indicate that a change in state in the driver assistance system is appropriate. In the event the driver state and the external state indicate a state change in the driver assistance system, control passes to 408. In 408, an indication is sent that a change in the driver assistance system state is appropriate. Control then passes to 410. In 406, in the event the driver state and/or the external state do not indicate that a state change in the driver assistance system is appropriate, control passes directly to 410. In 410, it is determined whether the driver state and/or the external state indicate that state change in the driving subsystem is appropriate. In the event the driver state and/or the external state indicate that a state change in the driving subsystem in 406 is appropriate, control passes to 412. In 412, an indication is sent that a change to the driving subsystems state is appropriate. The process then ends. In the event that the driver state and/or the external state do not indicate that a state change in driving subsystem in 412 is appropriate, the process ends.

Figure 5:
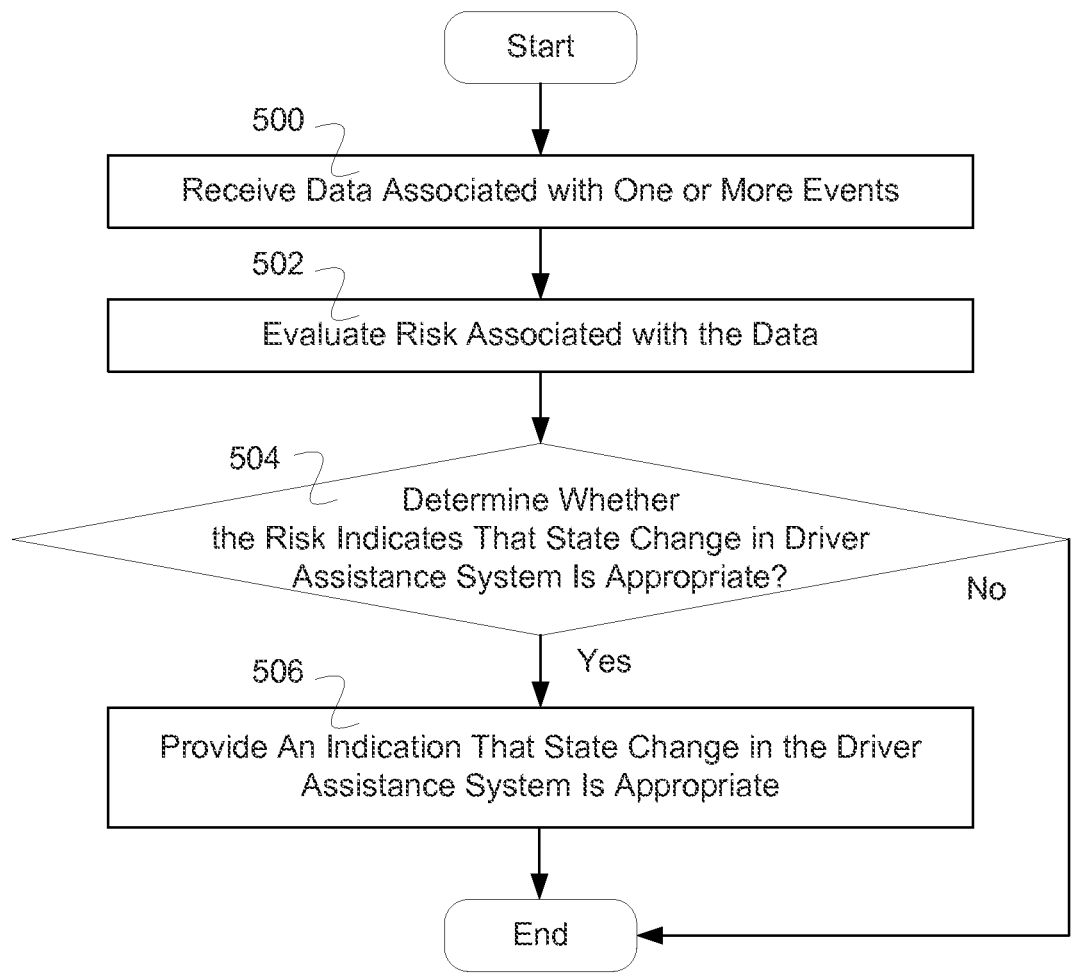
FIG. 5 is a flow diagram illustrating an embodiment of a process for providing an indication to change the state of a driver assistance system.

FIG. 5 is a flow diagram illustrating an embodiment of a process for providing an indication to change the state of a driver assistance system. In some embodiments, the process of FIG. 5 is executed by automation control component 102 of FIG. 1. In the example shown, in 500, data associated with one or more events is received. For example, sensor data is analyzed to determine whether one or more events are to be recorded for analysis and evaluation. In various embodiments, an event of the one or more events comprises a driving event that is recorded and evaluated for a state of a driver, an external state indicative of risk, or any other appropriate data. In 502, the risk associated with the data is evaluated. In 504, it is determined whether the risk indicates that a state change in a driver assistance system is appropriate. In the event that it is determined that the risk indicates that a state change in a driver assistance system is appropriate, in 506, an indication is provided that a change of state of the driver assistance system is appropriate. In some embodiments, it is indicated to the driver the issue, additionally the vehicle is caused to initiate automated control. In various embodiments, the indications can be any form including visual indication (e.g., a light emitting diode or panel indication), an audio indication (e.g., spoken, ear con, etc.), haptic, or any other appropriate indication. In the event that it is not determined that the risk indicates that a state change in a driver assistance system is appropriate, the process ends.

In some embodiments, a vehicle is equipped with risky driving detection algorithms and automation control application and automated driving assistance functionality ranging from National Highway Traffic Safety Administration (NHSTA) defined level 1 to 5. The automation control component system and automated vehicle systems are interconnected within the vehicle based on one of the supported integration models including wired connections (e.g., vehicle bus connection such as J1939, J1708/J187, OBD-II or Ethernet) or wireless connections (e.g., Wi-Fi or Bluetooth). The risky driving detection algorithms are focused on identifying risky driving.

In some embodiments, providing an indication that a change to the state of a driver assistance system is appropriate includes providing an indication to engage the automation systems to mitigate risk for the identified condition. For the case of cell phone use detection, the risky driving detection determines the use of a handheld cell phone by the driver based on any available method including machine vision analysis. Because handheld cell phone use is known to be a risky behavior, the system initially alerts the driver of their risky behavior. The behavior identification is communicated with either light-emitting diode (LED) patterns or audible feedback. The audible feedback may be an earcon, tone, or spoken message. LED patterns may consist of light patterns (e.g., solid red or red/blue flashing). The feedback or alert is designed to communicate to the driver both of the driver's risky behavior and that the automated systems are being engaged (e.g., "You are violating the handheld cell phone policy so the automated driving system is auto engaging."). The vehicle's automated system is queried regarding available systems and their current activation state. When the desired automated systems are not active, the automation control application enables the appropriate systems. Enabling the automation systems comprises communicating with the automation systems based upon either standard or proprietary interfaces (e.g., with a Society of Automotive Engineers J1939 bus), transmitting messages including requests for relevant automation systems and their operational state, receiving automation systems state responses and transmitting messages to enable/disable automation systems. For the duration that the automated systems are engaged by the automation control application, there is an indication of this state to the driver. The indication may include an audible indication, a visual indication (e.g., a pattern either static or dynamic of lit LEDs), a haptic indication to indicate the automated state, or other appropriate feedback. The automation system is engaged to allow the vehicle control systems to correct for imminent threats or to take corrective actions to minimize driving risk. For cell phone utilization, automated driving system benefits are available starting with NHSTA level 1 technologies (e.g., systems that maintain a configured vehicle following distance or lane centering capabilities). Safety benefits are available for vehicles with NHSTA level 1 systems and the benefits increase up to level 4 full automation. Once the automated driving systems are activated by the automation control application, the automated control is dependent on the level of automation supported. As an example of function specific automation (NHSTA level 1) with a vehicle supporting lane centering and a driver weaving within their lane or departing their lane, the vehicle corrects the driver inputs and maintains lane centering. Additionally with a vehicle supporting headway maintenance and a driver failing to maintain an appropriate following distance as determined by the system configuration, the vehicle corrects the driver input and eases the throttle and/or engages the brakes. As an example of a fully autonomous system (NHSTA level 4), the vehicle could request the driver speak a destination allowing a seamless transition from driver control to fully autonomous operation. If the driver does not offer a destination, the system may continue on the current path or pull over at the nearest rest stop or parking lot. Once the risky behavior resolves (which in the example above corresponds to ending the handheld cell phone violation), the system prompts the driver if they'd like to disengage the automated control. The driver acknowledging deactivating the automated control is important so the driver accepts full control of the vehicle. Acknowledgment from the driver may correspond to the driver turning off the system or actively accepting control by a confirming voice or dash control. Driver override of the engaged automation system prior to resolving the risky behavior is supported for behaviors that allow automation override. The setting rules involve legal requirements; level of riskiness, and, for commercial drivers, the corporate policy.

In some embodiments, for the case where the risky driving detection system identifies an intoxicated driver, the system is similar to the case of cell phone detection except for the higher severity of infraction. In the case of an intoxicated driver, the alerting the driver and auto engagement of the automated driving systems would be similar. The difference would be blocking the driver from disengaging the automated system. Additionally the case of an intoxicated driver is unique from cell phone utilization, distraction, aggressive driving or other temporary states in that it takes time to metabolize alcohol from the body. In this case, the locking out driver control of the vehicle cannot clear on a power cycle. For the case of intoxicated driver, the system is required to recognize a change of driver via machine vision or biometric confirmation. Without a confirmed change of driver, the system shall lockout driver control for a configured time period. This lockout may additionally include methods to actively keep a driver from operating the vehicle during the lockout period. Methods may include an interlock on the starter system or the transmission.

In some embodiments, the risky driving detection system identifies a high severity infraction (e.g., drunk driver) and progressively disables the vehicle allowing the driver time to safely pull over. This type of control would allow for integration starting with NHSTA Level 0 automation. For this case, the system would indicate to the driver that a high severity infraction has been identified and that the vehicle will begin the automatic shutdown procedure. The behavior identification and start of vehicle shutdown is communicated to the driver with LED patterns, audible feedback, or haptic feedback. The audible feedback may be an earcon, tone, or spoken message. The feedback or alert is designed to communicate to the driver that the vehicle is beginning the shutdown procedure and that the driver should pull over the vehicle (e.g., "You have been identified as an intoxicated driver and the vehicle is entering shutdown mode."). The automation control communicates with the vehicle speed control system to enter into a dynamic governor mode. Communications with the speed control system are based upon either standard or proprietary messages (e.g., J1939 messages or a direct connect to the control unit). The governor mode is intended to start at an upper limit with a maximum speed decay time based upon the system configuration (e.g., initial maximum allowed speed to 0 mph over 5 minutes). The initial maximum allowed speed would be based upon either the integrated map solution with speed data or a default setting. For the case of an integrated map solution, the initial maximum speed would be a percentage of the legal speed limit (e.g., 85% of the speed limit). The control of the governor mode may be initiated or fully controlled by the automation control system. This solution would allow the driver time to safely pull over the vehicle. The system lockout cannot clear simply on a power cycle. The system is required to recognize a change of driver via machine vision or biometric confirmation to immediately re-enable the system. Without a confirmed change of driver, the system shall lockout driver control for a configured time period. This lockout may include additional methods to actively keep a driver from operating the vehicle during the lockout period. Additional methods may include an interlock on the starter system or the transmission.

In some embodiments, NHTSA defines vehicle automation as having five levels: No automation (e.g., level 0): The driver is in complete and sole control of the primary vehicle controls—brake, steering, throttle, and motive power—at all times. Function-specific automation (e.g., level 1): Automation at this level involves one or more specific control functions. Examples include electronic stability control or pre-charged brakes, where the vehicle automatically assists with braking to enable the driver to regain control of the vehicle or stop faster than possible by acting alone. Combined Function Automation (e.g., level 2): This level involves automation of at least two primary control functions designed to work in unison to relieve the driver of control of those functions. An example of combined functions enabling a level 2 system is adaptive cruise control in combination with lane centering. Limited Self-Driving Automation (e.g., level 3): Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. The Google™ car is an example of limited self-driving automation. Full Self-Driving Automation (e.g., level 4): The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatic engagement of a driver assistance system, comprising:
   an input interface configured to receive a data associated with one or more events;
   a processor configured to:
      evaluate the risk associated with the data; and
      determine a level of severity of the risk, comprising:
         compare conditions associated with the data with a first criteria;
         in the event that the conditions associated with the data correspond to the first criteria, assign a first level to the level of severity of the risk; and
         in the event that the conditions associated with the data do not correspond to the first criteria:
            compare the conditions with a second criteria, the first criteria being different from the second criteria; and
            in the event that the conditions correspond to the second criteria, assign a second level to the level of severity of the risk;
         determine that the risk indicates a state change in a driver assistance system is appropriate, wherein in the event that the level of severity of the risk corresponds to the second level, a driver is given the option to disengage the driver assistance system, and wherein in the event that the level of severity of the risk corresponds to the first level, a driver is blocked from disengaging the driver assistance system; and
   an output interface configured to provide an indication that the state change in the driver assistance system is appropriate, wherein the indication corresponds to a visual or an audible indication.

2. The system of claim 1, wherein the driver assistance system comprises an autonomous driver assistance system.

3. The system of claim 1, wherein the processor is further configured to:
   determine that the risk indicates a state change in more than one driving subsystems is appropriate.

4. The system of claim 3, wherein the output interface is further configured to:
   provide an indication that the state change to one or more driving subsystems is appropriate.

5. The system of claim 1, wherein the output interface is further configured to:
   provide the data to a server for evaluation.

6. The system of claim 1, wherein the risk comprises a distracted driving risk.

7. The system of claim 1, wherein the risk comprises a drowsy driving risk.

8. The system of claim 1, wherein the risk comprises an intoxicated driving risk.

9. The system of claim 1, wherein the risk comprises an aggressive driving risk.

10. The system of claim 1, wherein the risk comprises a legal infraction risk.

11. The system of claim 1, wherein the risk indicates an abnormal driving risk.

12. The system of claim 1, wherein the risk indicates an icy roads risk.

13. The system of claim 1, wherein the risk indicates a poor visibility risk.

14. The system of claim 1, wherein the risk indicates a rain risk.

15. The system of claim 1, wherein the risk indicates a failing brake risk.

16. The system of claim 1, wherein the risk indicates a damaged tire risk.

17. The system of claim 1, wherein evaluating the risk comprises evaluating a driver state and evaluating an external state.

18. The system of claim 1, wherein an event of the one or more events comprises a driving event that is recorded and evaluated for a state of a driver or an external state indicative of risk.

19. A method for automatic engagement of a driver assistance system, comprising:
   receiving data associated with one or more events;
   evaluating, using a processor, the risk associated with the data;
   determining a level of severity of the risk, comprising:
      comparing conditions associated with the data with a first criteria;

in the event that the conditions associated with the data corresponds to the first criteria, assigning a first level to the level of severity of the risk; and in the event that the conditions associated with the data do not correspond to the first criteria:

comparing the conditions with a second criteria, the first criteria being different from the second criteria; and in the event that the conditions correspond to the second criteria, assigning a second level to the level of severity of the risk;

determining that the risk indicates a state change in a driver assistance system is appropriate, wherein in the event that the level of severity of the risk corresponds to the second level, a driver is given the option to disengage the driver assistance system, and wherein in the event that the level of severity of the risk corresponds to the first level, a driver is blocked from disengaging the driver assistance system; and providing an indication that the state change in the driver assistance system is appropriate, wherein the indication corresponds to a visual or an audible indication.

20. A computer program product for automatic engagement of a driver assistance system, the computer program product being embodied in a non-transitory computer readable storage medium and comprising computer instructions for:

receiving data associated with one or more events;

evaluating the risk associated with the data;

determining a level of severity of the risk, comprising:

comparing conditions associated with the data with a first criteria;

in the event that the conditions associated with the data corresponds to the first criteria, assigning a first level to the level of severity of the risk; and in the event that the conditions associated with the data do not correspond to the first criteria:

comparing the conditions with a second criteria, the first criteria being different from the second criteria; and in the event that the conditions correspond to the second criteria, assigning a second level to the level of severity of the risk;

determining that the risk indicates a state change in a driver assistance system is appropriate, wherein in the event that the level of severity of the risk corresponds to the second level, a driver is given the option to disengage the driver assistance system, and wherein in the event that the level of severity of the risk corresponds to the first level, a driver is blocked from disengaging the driver assistance system; and providing an indication that the state change in the driver assistance system is appropriate, wherein the indication corresponds to a visual or an audible indication.

21. A system as in claim 1, wherein the processor is further configured to:

after the driver assistance system has undergone the state change:

compare conditions associated with new data with the second criteria, wherein the new data relates to data received after the driver assistance system has undergone the state change; and in the event that the conditions associated with the new data do not correspond to the second criteria:

determine that the conditions associated with the new data indicate a resolution of risky driving behavior; and indicate another state change in the driver assistance system.

22. A system as in claim 21, further comprising:

in the event that driver is blocked from disengaging the driver assistance system:

in the event that a driver change is recognized:

determine that the conditions indicate a resolution of risky driving behavior; and indicate another state change in the driver assistance system.

* * * * *